Oct. 29, 1963 R. N. MELLOTT 3,109,104

GATING CIRCUIT

Filed Dec. 9, 1959 2 Sheets-Sheet 1

ROBERT N. MELLOTT
INVENTOR.

BY Morris Spector
Arthur Decker

ATTORNEYS

Oct. 29, 1963 R. N. MELLOTT 3,109,104

GATING CIRCUIT

Filed Dec. 9, 1959 2 Sheets-Sheet 2

ROBERT N. MELLOTT
INVENTOR.

BY Morris Spector
Archer Decker

ATTORNEYS

United States Patent Office 3,109,104
Patented Oct. 29, 1963

3,109,104

GATING CIRCUIT

Robert N. Mellott, Northridge, Calif., assignor to Thompson Ramo Wooldridge Inc., Los Angeles, Calif., a corporation of Ohio Filed Dec. 9, 1959, Ser. No. 858,476
8 Claims. (Cl. 307—88.5)

This invention relates to electronic gating circuits and, more particularly, to circuits for developing an output signal in response to a predetermined coincidence of input signals.

In electronic circuitry such as that used in digital computers, binary information may be represented by the output signals from bistable state circuits, notably, flip-flops. Two types of flip-flops commonly used are the "static" type and the "dynamic" type. Both types may have two inputs and two outputs. The output signals are bivalued and complementary and the inputs are triggered by a pulse ("clock") signal if passed by the gating circuits connected to the inputs. The "static" type of flip-flop, of which the Eccles-Jordan trigger circuit is representative, is characterized by two stable states, one prevailing during each "digit period" of computer operation: a "false" state (storage of binary 0), in which one output signal may be at a positive potential level (i.e. +5 volts in a transistorized system) while the other output signal is at a negative potential level (i.e., —5 volts), and a "true" state (storage of binary 1), in which the potential polarities of the output signals is reversed. The "dynamic" type of flip-flop is also characterized by two states, one prevailing during each digit period: a "false" state in which, at the start of the digit period, one output signal is at a positive potential level while the other output signal is at a negative potential level and, at the end of the digit period, the potential polarities are reversed, and a "true" state in which all potential polarities characterizing the true state are reversed. It is thus apparent that, in a dynamic system, in addition to the clock signal, another pulse signal of the same repetition rate must be provided and timed to occur during the digit period. The dynamic type of flip-flop is often referred to, by those skilled in the art, as a "phase bistable state" flip-flop and the signals therefrom referred to as "phase bistable" signals.

The signals needed to trigger either type of flip-flop, as stated, are usually developed by gating circuits connected to the inputs. These gating circuits operate in response to a predetermined coincidence of their input signals in accordance with rules of logic. Each gate input signal comprises the output of a circuit such as a flip-flop, timing signal generator, etc.

Two types of logical gates commonly used are the "and" gate and the "or" gate; for purposes of illustration, the "and" gate will be said to produce a positive potential signal in response to coincidence of all input signals at a positive potential and the "or" gate will be said to produce a positive potential signal when at least one of its input signals is at a positive potential.

One well-known type of construction for gating circuits, generally referred to as a series gating circuit, has been constructed using such components as vacuum tubes or transistors connected directly to the flip-flop outputs. Thus, a series "and" gating circuit may provide a plurality of transistors, one corresponding to each input signal (i.e., flip-flop output). The transistors are connected together in series such that the collector of one is connected to the emitter of another, thereby forming a series string of the transistor emitter-collector paths. A source of potential is connected in parallel with the series string, at one end to a transistor collector through a resistor, and, at the other end to a transistor emitter. Each input signal to the gating circuit is applied at the base of its corresponding transistor. Output from the gate is taken at the junction of the resistor and the transistor collector connected to it. Such a circuit is considered an "and" gate because, if any one of the input signals is not at a predetermined value, there will be essentially an open circuit in the transistor string and no output signal will be developed.

It has been noted that, if every transistor in the series has its emitter-base junction forward biased such that all collector-to-emitter paths are conducting, current will flow not only in these paths, but also in each emitter-to-base path. Thus, current flowing out of the base of the transistor whose collector is connected to the resistor must also flow through the emitter-to-collector path of the transistor whose emitter is connected directly to the source of potential. It follows that, in this construction, the maximum number of inputs that can be gated is a function of the power-dissipating ability of the last-mentioned transistor. Also, such series gates are characterized by a polarity inversion between the input signals and the output signal, and this may be undesirable in some applications. Furthermore, at high input signal repetition rates, in this construction the minority carrier storage effect may cause a time delay before the transistors may be driven out of a heavily conductive condition, thus limiting the speed at which other computer components may be operated. As a consequence, although such a gate may be appropriate for use with static flip-flops, they may be quite inappropriate to gate phase bistable input signals generated in a dynamic computer system, which signals, as already pointed out, may change state at a rate twice that of the computer clock signal repetition rate.

Accordingly it is an object of the present invention to provide a gating circuit for developing triggering signals in a phase bistable computer system.

Another object of this invention is to provide a gating circuit which can accept a very large number of input signals, and develop an output signal substantially independent of minor variations in input signal levels.

A further object of this invention is to provide gating circuitry the output signal of which is in phase with its input signals.

Other objects and attendant advantages of this invention will become evident to those skilled in the art upon referring to the following description of the accompanying drawings in which, FIGURE 1 is a schematic diagram of an embodiment of the invention operative as an "and" gate to generate the signal $A_1B_1$, and utilizing diodes as a switching elements;

Circuits embodying this invention may be used in electronic equipment such as a digital computer where there is a basic source of timing pulses for the entire computer. These are generally referred to as clock pulses and may be generated from a timing signal channel on a rotating magnetic drum, for instance. They are of constant repetition rate and amplitude sufficient to trigger computer flip-flops. The time separation between clock pulses defines the computer digit period. The preferred phase bistable state flip-flops used to represent information in illustrating the invention herein, must reliably change state once during the digit period; this may be accomplished by using a source of recurring timing pulses of the same repetition rate as the computer clock pulses, appropriately gated to energize the flip-flop. In the figures, these timing pulses will be noted to occur midway between clock pulses; however this it not essential to the operation of the circuits embodying this invention.

Figures 1, 3:
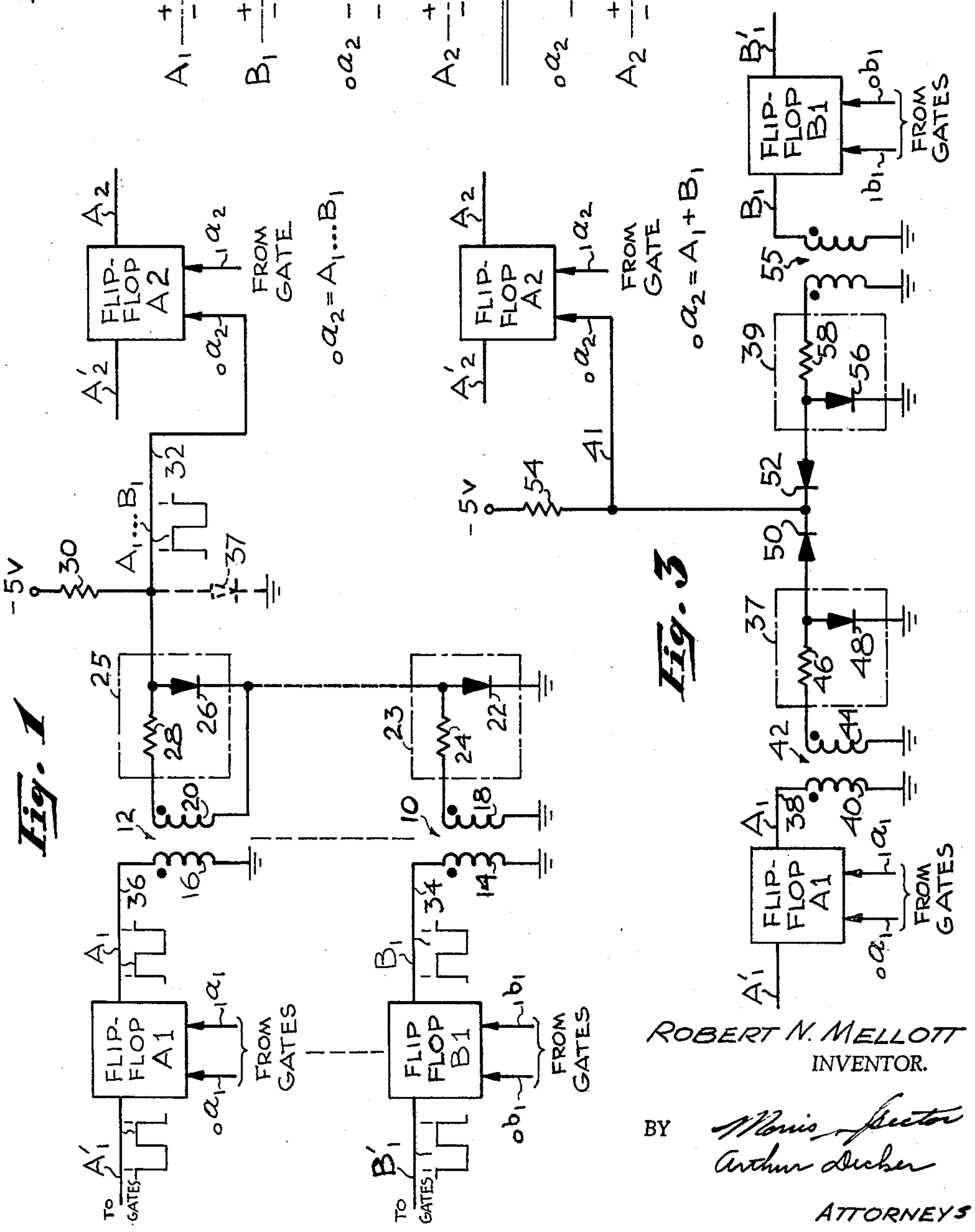
FIGURE 3 is a schematic diagram of an embodiment of the invention operative as an "or" gate to generate the signal $A_1+B_1$, and utilizing diodes as switching elements.

Referring now to FIGURE 1, here is shown, according to the invention, an "and" gate using diodes as switching elements. The gate is illustrated as having two input signals, represented by the symbols $A_1$ and $B_1$ although, of course, no limitation in this respect is intended. The two input signals are developed as outputs of flip-flops A1 and B1, respectively, which are of the dynamic type.

The complementary outputs $A_1'$ and $B_1'$ of flip-flops A1 and B1, as shown, may be transmitted to other computer gates. Also, inputs to the flip-flops are from gates and are synchronized with the clock signal and the mid-digit period signal. Inputs ${}_1a_1$ and ${}_0a_1$ serve to trigger flip-flop A1 true (storage of binary 1) and false (storage of binary 0), respectively. Similar terminology will be used herein to describe all flip-flop signals.

The "and" gate shown in FIGURE 1 includes a transformer and a switching network corresponding to each input signal. Thus, line 34, carrying signal $B_1$, is connected to one end of primary winding 14 of transformer 10, secondary winding 18 of which is connected in shunt with switching network 23, comprising the serial combination of diode 22 and resistor 24. The other ends of primary winding 14 and secondary winding 18 and the cathode of diode 22 are grounded. The arrangement for line 36, carrying signal $A_1$, is similar, except that the junction of diode 22 and resistor 24 in switching network 23 serves as the common point for connecting diode 26 and secondary winding 20 of transformer 12, and that the junction of diode 26 and resistor 28 of switching network 25 is connected to one end of resistor 30, the other end of which is connected to the −5 volt supply. Output from the gate is taken on line 32, and serves as the input signals ${}_0a_2$ for flip-flop A2.

Transformers 10 and 12 may both have a 1:1 turns ratio with phase as shown by the polarity dots adjacent the windings, and are characterized as being able to pass recurring pulses having a repetition rate twice the clock signal repetition rate and pulse widths equal to half a digit period, without appreciable distortion. Diodes 22 and 26 may be of the silicon or germanium type; broadly, any unilaterally conductive device will serve.

Figure 2:
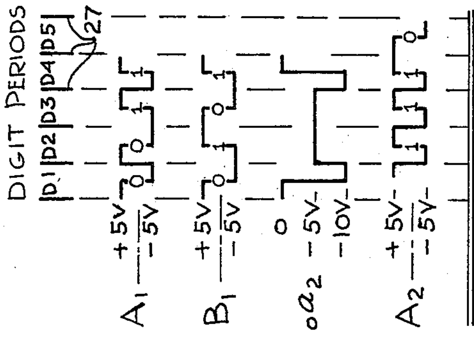
FIGURE 2 shows waveshape graphs of the input signals and the output signal for the embodiment of FIGURE 1.

The operation of the circuit of FIGURE 1 can be observed in the waveshape graphs of FIGURE 2, wherein typical operating voltages are given. It may be pointed out that the preferred dynamic flip-flops are arranged to be capable of changing state between a digit 1 and a digit 0 at the rise (leading edges) of recurring computer clock signal pulses, indicated in FIGURE 2 by vertical marks 27 which designate five sequential digit periods D1 through D5. It may be also noted that the preferred flip-flops are triggered to change state in the center of a digit period by a mid-period timing signal. For simplicity, both the clock signal and the mid-period timing signal will not be shown, but it is to be understood that these signals are inputs to all gates in the computer system.

For purposes of illustration, flip-flop A1 is seen to store the binary digits 0, 0, 1, 1 and flip-flop B1 stores the binary digits 0, 1, 0, 1 during the successive digit periods D1, D2, D3 and D4. In this example, the gate operates upon output signal $A_1$ of flip-flop A1 and output signal $B_1$ of flip-flop B1 to produce signal ${}_0a_2$ which is effective to trigger flip-flop A2 false only if both flip-flop A1 and flip-flop B1 simultaneously store a binary digit 1. This activity may be represented by the logical equation ${}_0a_2=A_1B_1$.

During the first half of digit period D1, signals $A_1$ and $B_1$ are both at the +5 volt potential. Therefore, the signal developed in winding 18 will be 5 volts in magnitude and positive at the end connected to resistor 24. Current will consequently flow around the loop from secondary winding 18 through resistor 24, through diode 22 and back to winding 18. Diode 22 is thus forward biased and presents a very low impedance. A similar condition exists in the loop comprising secondary 20, resistor 28, and diode 26. A current conductive low impedance path consequently exists between the −5 volt supply and ground through diodes 22 and 26 and signal ${}_0a_2$ is therefore at 0 volts.

At the middle of period D1, both input signals $A_1$ and $B_1$ change in potential from +5 volts to −5 colts, the dot-indicated ends of windings 18 and 20 become negative, and diodes 22 and 26 are back biased, thereby presenting very high impedances. The flow of current between the −5 volt supply and ground is essentially cut off, and signal ${}_0a_2$ drops to a −10 volt level, since, for this condition, windings 18 and 20 are basically in series-aiding relationship.

It can thus be appreciated that, because signal ${}_0a_2$ is not at ground or a positive potential level, at the occurrence of a clock pulse, at the termination of period D1, it will not be effective to trigger flip-flop A2 to the false state; flip-flop A2, presuming an initially true state, will remain true for period D2.

During period D2, flip-flops A1 and B1 are out of phase; flip-flop A1 stores a digit 0 and flip-flop B1 stores a digit 1. Thus, during the first half of the digit period, signal $B_1$ is at −5 volts and diode 22 remains reverse biased, and signal $A_1$ is at +5 volts and diode 26 is forward biased. Signal ${}_0a_2$ is thus at −5 volts. At the middle of the digit period, signals $A_1$ and $B_1$ change polarity, forward biasing diode 22 and back biasing diode 26. Signal ${}_0a_2$ thus remains at −5 volts and flip-flop A2 is not triggered false.

During period D3, flip-flops A1 and B1 are again out of phase, although their storage content is reversed. Signal ${}_0a_2$ remains at −5 volts and flip-flop A2 is not triggered false.

During period D4, flip-flops A1 and B1 are again in phase, both flip-flops storing a digit 1. Signals $A_1$ and $B_1$ are at −5 volts during the first half of the digit period and at +5 volts during the last half of the digit period. Both diodes 22 and 26 are back biased during the first half of the digit period and forward biased during the last half of the digit period. As shown, signal ${}_0a_2$ is at −10 volts during the first half of the digit period and essentially at 0 volts potential during the last half of the digit period.

The only time the output of the gate is effective to represent the result of a logical operation on its input signals, is when the clock pulse occurs defining the end of a digit period. Further, the only time signal ${}_0a_2$ is above the minimum triggering level for flip-flop A2 at the occurrence of a clock pulse, is at the end of period D4. Therefore, only at this time does the gate allow the clock pulse to trigger flip-flop A2 false; flip-flop A2 is thus false during period D5. It may consequently be seen that the operation of the gate of FIGURE 1 may be represented by the logical equation ${}_0a_2=A_1B_1$.

Additional inputs may be provided to the "and" gate by adding another switching circuit and transformer for each. It has been observed, however, that, due to the small voltage drop across a diode when it is in the forward biased condition, as inputs are added, the voltage drop from ground to the output (line 32), will increase. If the total forward voltage drop exceeds the minimum triggering level for flip-flop A2, the gate may not allow clock pulses to trigger the flip-flop and there may be some loss of reliability. If, in an installation, this problem is to be avoided, a diode, such as diode 37, shown in dashed line in FIGURE 1, may be connected between output line 32 and ground, poled in the same direction as the switching diodes. Thus, if all switching diodes are forward biased, the maximum voltage drop from ground to the output line would be the forward drop of only diode 37.

FIGURE 3 shows an "or" gate using diodes as switching elements, and having two inputs. The two input signals, $A_1$ and $B_1$, are one output signal each of two flip-flops A1 and B1. The "or" gate operates upon these signals to produce an output signal ${}_0a_2=A_1+B_1$ which is effective to trigger flip-flop A2 false if either flip-flop A1 or flip-flop A2 or both store a binary digit 1.

The "or" gate includes a switching circuit and a transformer associated with each input signal. The circuit associated with signal $A_1$, for instance, includes switching circuit 37 comprising resistor 46 and diode 48 and transformer 42 having primary winding 40 and secondary winding 44. These components are of the same type as for those in FIGURE 1, and they are connected similarly. Signal $A_1$ appears on line 38 and across primary winding 40. Transformer 55 and switching circuit 39 correspond to signal $B_1$ of flip-flop B1. Switching circuits 37 and 39 are essentially connected in parallel and, in order to isolate the anodes of switching diodes 48 and 56, isolation diodes 50 and 52 are employed, their anodes being connected to the anodes of switching diodes 48 and 56, respectively, and their cathodes being connected together and to the junction of gate output line 41 and resistor 54; the other end of resistor 54 is connected to the −5 volt supply. Output from the gate, on line 41, serves as input signal ${}_0a_2$ for flip-flop A2.

Figure 4:
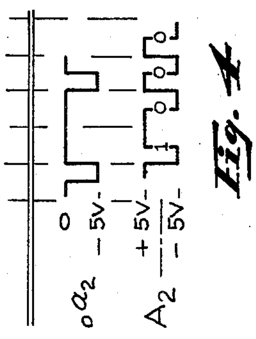
FIGURE 4 shows waveshape graphs of the input signals and the output signal for the embodiment of FIGURE 3.

The signals $A_1$ and $B_1$ shown in FIGURE 2 also apply to FIGURE 4 in explaining the operation of the "or" gate of FIGURE 3. Since flip-flops A1 and B1 store the binary digits 0, 0, 1, 1 and 0, 1, 0, 1, respectively, during the successive digit periods D1, D2, D3 and D4, output ${}_0a_2$ of the gate will be shown to trigger flip-flop A2 false at the end of digit periods D2, D3 and D4.

During the first half of period D1, when signals $A_1$ and $B_1$ are at +5 volts, switching diodes 48 and 56 are forward biased, and have essentially a 0 volt potential drop between cathode and anode. Current flows from ground through isolation diodes 50 and 52 and line 41 (signal ${}_0a_2$) is at ground potential. However, there is no clock signal pulse and thus flip-flop A2 is not triggered false. During the last half of period D1, when signals $A_1$ and $B_1$ are at −5 volts, switching diodes 48 and 56 are reverse biased and the potential on the anodes of isolation diodes 50 and 52 and on line 41 is −5 volts; flip-flop A2 is thus not triggered false. Therefore, presuming that flip-flop A2 was true during period D1, it will remain true for period D2.

During digit periods D2 and D3, flip-flops A1 and B1 are out of phase, one of the diodes 48 and 56 is forward biased while the other is reverse biased. Current flows from ground through the forward biased diode and line 41 (signal ${}_0a_2$) is at 0 volts during both digit periods. Therefore, the clock pulses which terminate periods D2 and D3 both trigger flip-flop A2 into the false state.

During the first half of period D4, the potential on the anodes of switching diodes 48 and 56 and hence that of line 41, is −5 volts, and during the last half of this digit period, this potential is 0 volts. Flip-flop A2 is again triggered false at the end of period D4 and is thus false during period D5.

In summary, signal ${}_0a_2$ is such that, at the occurrence of the clock signals marking the ends of periods D2, D3 and D4, flip-flop A2 is triggered false, and as a result, is in this state during periods D3, D4 and D5.

As with the "and" gate of FIGURE 1, although only two inputs have been shown for illustrative purposes in FIGURE 3, additional inputs may be handled by adding a switching circuit isolation diode, and input transformer for each.

Figures 5, 6, 7:
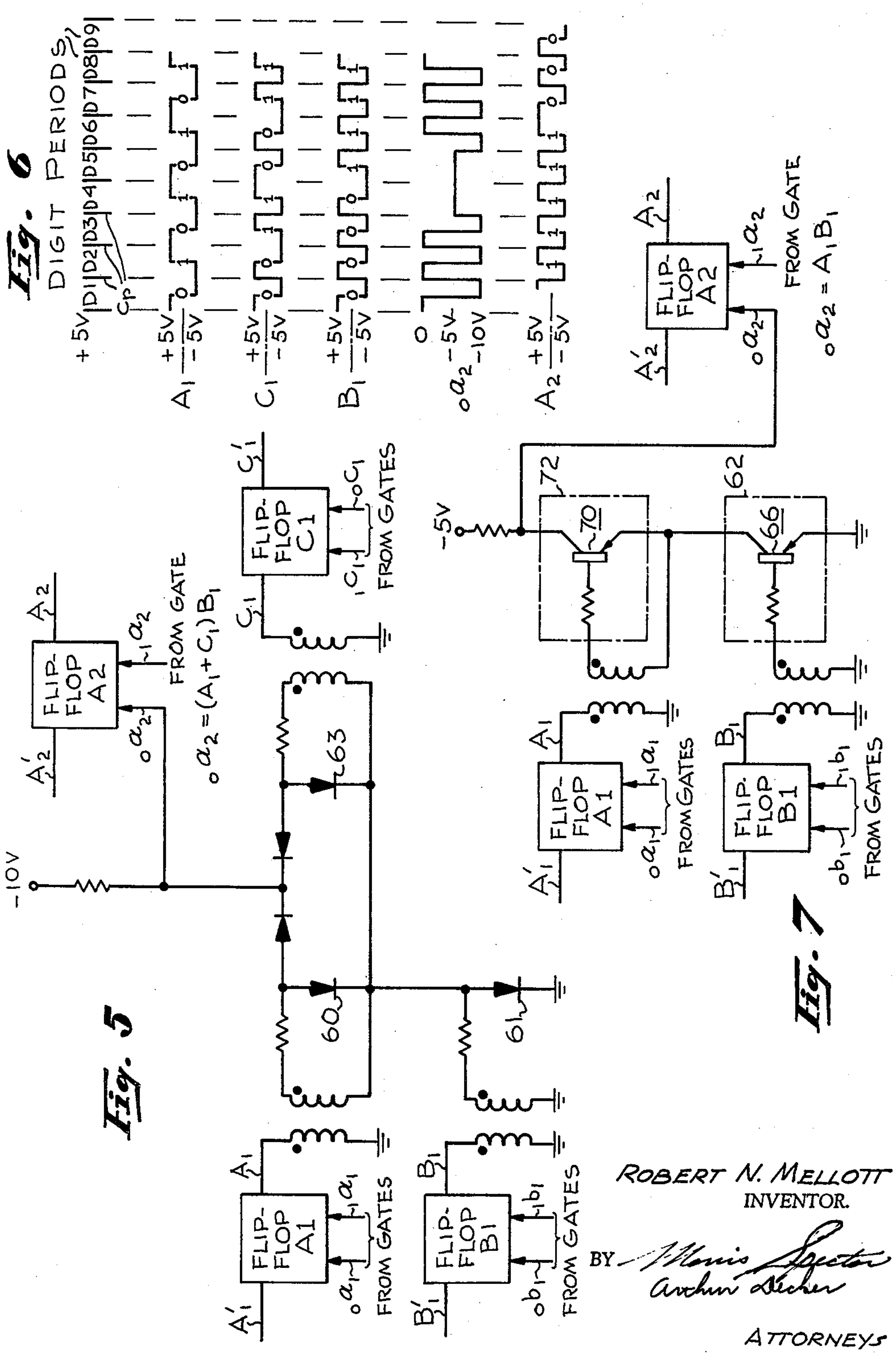
FIGURE 5 is a schematic diagram of an embodiment of the invention operative as an "and-or" gate to generate the signal $(A_1+C_1)B_1$, and utilizing diodes as switching elements.
FIGURE 6 shows waveshape graphs of the input signals and the output signal for the embodiment of FIGURE 5.
FIGURE 7 is a schematic diagram of an embodiment of the invention operative as an "and" gate to generate the signal $A_1B_1$, and utilizing transistors as switching elements.

FIGURE 5 shows an "and-or" gate embodying the invention, which gate operates on outputs $A_1$, $B_1$ and $C_1$ of flip-flops A1, B1 and C1, respectively, to produce signal ${}_0a_2=(A_1+C_1)B_1$, effective to trigger flip-flop A2 false when flop-flop B1 and either or both flip-flops A1 and C1 store a binary digit 1.

Similarity of the circuit of FIGURE 5 to those of FIGURES 1 and 3 is evident and a description of the figure is not considered necessary. FIGURE 6, however, shows exemplary waveshape graphs for the input signals and the output signal for the operation of the gate of FIGURE 5 for nine digit periods, D1 through D9, encompassing all possible combinations of the states of these flip-flops. As shown, flip-flop A1 stores the digits 0, 1, 0, 1, 0, 1, 0, 1, flip-flop C1 stores the digits 0, 0, 1, 1, 0, 0, 1, 1, and flip-flop B1 stores the digits 0, 0, 0, 0, 1, 1, 1, 1, during the successive digit periods D1 through D8, respectively.

It will be noted that, in order for signal ${}_0a_2$ to be at triggering potential for flip-flop A2 during the last half of a digit period, diode 61 and either diode 60 or diode 63 or both must be conductive. This condition prevails only for periods D6, D7 and D8. Consequently, flip-flop A2 is false during periods D7, D8 and D9, as shown.

The gate of the invention is well adapted for use with transistors. Thus, FIGURE 7 shows an "and" gate according to the invention, using PNP transistors 70 and 66 as switching elements in switching circuits 72 and 62, respectively, to generate the signal ${}_0a_2=A_1B_1$. In this embodiment, it is the transistor emitter-to-collector paths which present a very high impedance or a very low impedance to the flow of current between ground and the −5 volt supply.

As should be obvious to those skilled in the art, the basic concept of this invention can be extended to include other more complex gating schemes, and any of the gates could be constructed to invert the polarity of its output signal merely by reversing the polarity of the source of potential, reversing the connections of diodes and utilizing other types of transistors than actually shown. Such embodiments, and also the substitution of elements such as vacuum tubes for transistors, for instance, and rearrangement of the figures to correspond, are contemplated as within the scope of the following claims.

What is claimed is:

1. A circuit for gating signals produced by a plurality of phase bistable state circuits, comprising: a plurality of transformers, one corresponding to each phase bistable state circuit and having a primary and a secondary, the primary being connected across its phase bistable state circuit; a plurality of switching circuits, one corresponding to each transformer and having a resistor and a diode in serial connection; means to connect the secondary of each transformer across its switching circuit; means to connect the junction of a transformer and its switching circuit to the junction of the resistor and the diode of another switching circuit; a source of energizing potential connected between the junction of the resistor and the diode of a switching circuit and the junction of a transformer and a switching circuit; and output means connected to the junction of the resistor and the diode of a switching circuit.

2. A circuit for gating signals produced by a plurality of phase bistable state circuits, comprising: a plurality of transformers, one corresponding to each phase bistable state circuit and having a primary and a secondary, the primary being connected across its phase bistable circuit; a plurality of switching circuits, one corresponding to each transformer and having a resistor and a diode in serial connection; means to connect the secondary of each transformer across its switching circuit; means to connect the junction of the resistor and the diode of a switching circuit to the junction of the resistor and the diode of another swtiching circuit; a source of energizing potential connected between the junction of said switching circuits and the junctions of said transformers and their switching circuits; and output means connected to the junction of said switching circuits.

3. The circuit of claim 2 and means to prevent electrical interaction of said switching circuits, said means being connected between a switching circuit and the junction of said switching circuits.

4. The circuit of claim 3 wherein said means to prevent electrical interaction of said switching circuits comprises a unilaterally conducive device.

5. A gating circuit for performing a logical "and" function with respect to a plurality of bivalued voltage level signals comprising: first and second steady state direct reference voltages, said second reference voltage being at ground potential; a resistor connected to said first reference voltage; a plurality of serially connected unidirectional current conducting devices poled in like manner and connected between said resistor and said second reference voltage; and means uniquely connecting each of said bivalued signals across a different one of said devices.

6. A gating circuit for performing a logical "and" function with respect to a plurality of bivalued voltage level signals comprising: first and second reference voltages; a resistor connected to said first reference voltage; a plurality of serially connected unidirectional current conducting devices connected between said resistor and said second reference voltage; means uniquely connecting each of said bivalued signals across a different one of said devices; said devices comprising diodes each having a cathode and an anode and including first and second end diodes, connected such that the cathode of the first end diode is connected to the anode of an adjacent diode, the anode of the first end diode is connected to said resistor and the cathode of the second end diode is connected to said second reference voltage.

7. A gating circuit for performing a logical "and" function with respect to a plurality of bivalued voltage level signals comprising: first and second reference voltages; a resistor connected to said first reference voltage; a plurality of serially connected unidirectional current conducting devices connected between said resistor and said second reference voltage; means uniquely connecting each of said bivalued signals across a different one of said devices; said devices comprising diodes, including first and second end diodes and intermediate diodes, connected such that the cathode of the first end and each intermediate diode is connected to the anode of an adjacent diode, the anode of the first end diode is connected to said resistor and the cathode of the second end diode is connected to said second reference voltage; and the first and second voltage levels of said bivalued signals being sufficient to respectively forward and back bias said diodes whereby the voltage at the junction between said resistor and said first end diode will be approximately equal to said second reference voltage when all of said diodes are forward biased and approximately equal to said first reference voltage when anyone of said diodes is back biased.

8. The circuit of claim 5 wherein said plurality of bivalued signals comprise the respective outputs of a plurality of phase bistable state circuits; and said means connecting said signals across said devices includes a plurality of transformers each of which is uniquely associated with each of said phase bistable state circuits.

References Cited in the file of this patent

UNITED STATES PATENTS

| | | |
|---|---|---|
| 2,535,303 | Lewis | Dec. 26, 1950 |
| 2,798,667 | Spielberg et al. | July 9, 1957 |
| 2,885,572 | Felker | May 5, 1959 |
| 2,934,271 | Kessel | Apr. 26, 1960 |
| 2,946,043 | Reenstra et al. | July 19, 1960 |
| 3,070,779 | Logue | Dec. 25, 1962 |